(12) United States Patent
Ostwald

(10) Patent No.: US 7,014,235 B1
(45) Date of Patent: Mar. 21, 2006

(54) INERTIA ACTUATION FOR ROBOTIC GRIPPER MECHANISM

(75) Inventor: Timothy C. Ostwald, Louisville, CO (US)

(73) Assignee: Storage Technology Corporation, Louisville, CO (US)

(*) Notice: Subject to any disclaimer, the term of this patent is extended or adjusted under 35 U.S.C. 154(b) by 184 days.

(21) Appl. No.: 10/246,240

(22) Filed: Sep. 18, 2002

(51) Int. Cl.
*B25J 15/00* (2006.01)

(52) U.S. Cl. ..................... 294/119.1; 901/38
(58) Field of Classification Search ............. 294/119.1, 294/115, 116, 86.3, 94; 901/31, 32, 38
See application file for complete search history.

(56) References Cited

U.S. PATENT DOCUMENTS

| | | | | |
|---|---|---|---|---|
| 3,170,322 A | * | 2/1965 | Cavanaugh | .................. 73/857 |
| 3,370,213 A | * | 2/1968 | Rose | ........................ 318/513 |
| 4,348,044 A | * | 9/1982 | Wood, III | .................... 294/88 |
| 5,125,708 A | * | 6/1992 | Borcea et al. | ................ 294/88 |
| 5,746,464 A | * | 5/1998 | Paul | ........................... 294/116 |
| 5,895,084 A | * | 4/1999 | Mauro | ........................ 294/100 |
| 5,931,518 A | * | 8/1999 | Pirker | ..................... 294/119.1 |

* cited by examiner

Primary Examiner—Dean J. Kramer
(74) Attorney, Agent, or Firm—Yee & Associates, P.C.

(57) ABSTRACT

A method for gripping objects by means of a robotic gripper mechanism is provided, wherein the gripping mechanism comprises gripping jaws, a wedge actuator between the gripping jaws, wherein the wedge actuator moves the gripping jaws together and apart as it slides backward and forward, and a motor that moves the wedge actuator by means of a connecting leadscrew. The method comprises applying current to the motor so that the motor reaches maximum operating speed before the gripper mechanism comes into contact with any object. When the gripping jaws contact an object, e.g., media cartridge, they collapse over the object, gripping it. The inertia from the rotating mass of the motor increases the force and speed of the gripping action. In another embodiment, a flywheel may be added to the leadscrew to provide additional rotating mass and increase the inertia before contact.

3 Claims, 2 Drawing Sheets

INERTIA ACTUATION FOR ROBOTIC GRIPPER MECHANISM

BACKGROUND OF THE INVENTION

1. Field of the Invention

The present invention relates generally to robotic gripper mechanisms, and more specifically to an improved actuator for the gripping action.

2. Background of the Invention

Typical robotic grippers (also known as end effectors) for automated data storage libraries are slow-speed pinching mechanisms for gripping onto a standard sized box-shaped media cassette. The size of the cassette usually dictates the range of movement of the gripper jaws. The simplest solution for proper movement of the jaws is to hinge them in the rear and provide an actuator to push them apart and pull them together in order to grip an object. Typically, a motor is used to drive a nut and linkage arrangement that moves the gripper finger together or apart.

Typical gripper mechanisms do not ramp up the motor to apply force to the jaws until the gripper makes contact with an object. Generally, the gripper has a limited time frame (e.g., 20 milliseconds) in which to grip the object. Because the motor must be ramped up to full speed after the object is encountered, part of the gripping time window must be used just to build up the requisite energy before the jaws can apply adequate force.

In addition to the time delay, the force produced by the motor must be generated from, a dead stop, thus limiting the amount of force that can be generated within the time window for a given sized motor.

Therefore, it would be desirable to have a method for increasing the speed and force of the gripping action with a given sized or perhaps smaller motor.

SUMMARY OF THE INVENTION

The present invention provides a method for gripping objects by means of a robotic gripper mechanism, wherein the gripping mechanism comprises gripping jaws, a wedge actuator between the gripping jaws, wherein the wedge actuator moves the gripping jaws together and apart as it slides backward and forward, and a motor that moves the wedge actuator by means of a connecting leadscrew. The method comprises applying current to the motor so that the motor reaches maximum operating speed before the gripper mechanism comes into contact with any object. When the gripping jaws contact an object, e.g., media cartridge, they collapse over the object, gripping it. The inertia from the rotating mass of the motor increases the force and speed of the gripping action. In another embodiment, a flywheel may be added to the leadscrew to provide additional rotating mass and increase the inertia before contact.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
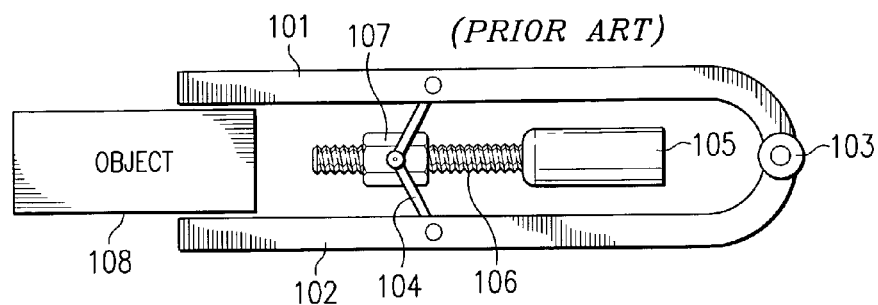
FIG. 1 depicts a schematic diagram illustrating a typical hinged gripper robot in accordance with the prior art.

Referring now to the figures, and more specifically to FIG. 1, a schematic diagram illustrating a typical hinged gripper robot is depicted in accordance with the prior art. Typical robotic grippers for automated data storage libraries are slow speed pinching mechanisms for gripping onto a standard sized box shaped media cassette. The size of the cassette usually dictates a range of movement of the gripper jaws and the simplest solution for proper movement of the jaws is to hinge them in the rear and provide an actuator to push them apart and pull them together to pinch an object.

FIG. 1 depicts a pair of hinged jaws 101 and 102 supported by a pivot 103 in the rear and a driving linkage 104 in the front. A motor 105 is connected to a screw 106, which, when rotated, drives a nut 107 connected to the linkage 104. This typical gripper has several limitations.

First, the jaws 101–102, because of their pivot point 103, will not remain parallel to each other as the cassette size varies in it's tolerance range, and certainly will not remain parallel for a non-standard or smaller form factor cassette. Parallelism would be desirable to control the attitude and griping surface friction of the jaws 101–102.

The second major problem with typical prior art grippers is that the linkage arms 104 can drive the gripper jaws in a non-linear force relationship. As the finger pivot angle changes, the linkage angles change, and a small change in gripper pinch width could result in a large difference in pinch force applied to the cassette.

A third limitation to prior art designs is the speed and force of the gripping action, which is also exacerbated by the first two limitations. Typical gripper mechanisms do not ramp up the motor 105 to apply force to the jaws 101–102 until the gripper makes contact with an object 108. Generally, the gripper has a limited time frame (e.g., 20 milliseconds) in which to grip the object 108. Because the motor must be ramped up to full speed after the object 108 is encountered, part of the gripping time window must be used just build up the requisite energy before the jaws can apply adequate force 101–102.

In addition to the time delay, the force produced by the motor must be generated from a dead stop, thus limiting the amount of force that can be generated within time window for a given sized motor. In addition, the problems described above related to changing gripper jaw angles also interfere with potential force output.

Figure 2:
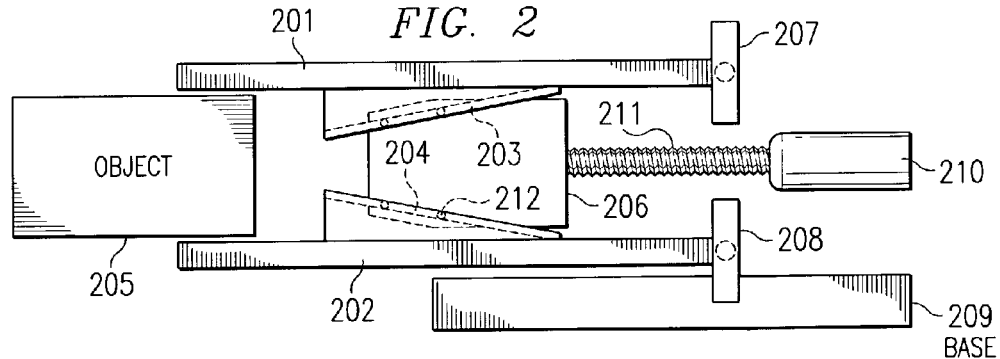
FIG. 2 depicts a schematic diagram illustrating a gripper with a parallel jaw mechanism and inertia driven wedge actuator in accordance with the present invention.

Referring now to FIG. 2, a schematic diagram illustrating a gripper with a parallel jaw mechanism and inertia driven wedge actuator is depicted in accordance with the present invention. The jaws 201 and 202 are supported and guided by slots 203 and 204 that are tipped at an angle. The jaws 201–202 are moveable vertically to pinch an object 205 by simply sliding the wedge 206 along the angled guide slot structures 203–204 in a horizontal direction. In addition, optional guide pins or ball bearings 212 may be placed in slots 203–204.

A motor 210 drives the wedge 206 by means of a leadscrew 211. The wedge 206 and slots 203–204 create linear force on the jaws 201–202 as they spread apart or together. Thus the guide slots 203–204 also become the driver device.

The example depicted in FIG. 2 assumes that "ribs" on the wedge 206 fit into slots 203–204. However, the design in FIG. 2 may also be switched so that guide slots are placed along the wedge 206, and structures 203 and 204 become the ribs that fit in such slots.

The guide surfaces 207 and 208 provide a way to keep the jaws 201–202 locked horizontally to the gripper base plate 209 without moving left or right relative to the plate. With these guide surfaces 207–208 in place, the sliding wedge 206 with integrated driver nut (not shown) is a means of actuating the gripper jaws 201–202 while holding them parallel. The sliding wedge 206 is also fixed in horizontal slots (not shown) in the base plate 209 to hold the wedge 206 in vertical alignment, while allowing it to slide left and right.

Thus, the present invention provides a robotic gripper that can grip several different shaped objects while retaining constant grip force. The mechanism grips with consistent force across all of the grip range and also grips the object with consistent orientation in space to keep the object in alignment with the library structure. This design also allows the gripper mechanism to increase the speed and force of the gripping action by using the inertia of the motor 210 built up prior to contact with a media cartridge.

Figure 3:
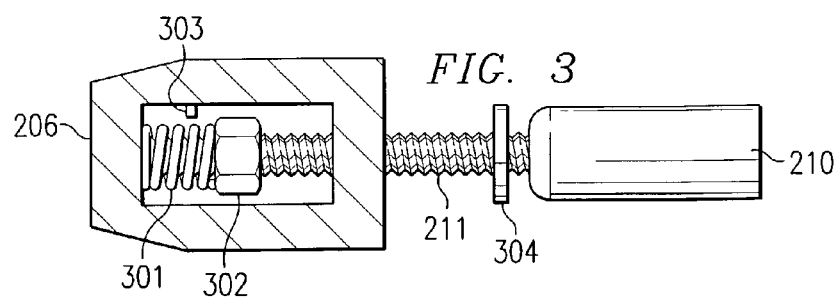
FIG. 3 depicts a schematic diagram illustrating internal details of the sliding wedge in accordance with the present invention.

Referring now to FIG. 3, a schematic diagram illustrating internal details of the sliding wedge is depicted in accordance with the present invention. FIG. 3 illustrates possible improvements that can be added to the design of the wedge 206 from FIG. 2. One improvement is a spring 301 to provide a preload between the lead driver nut 302 and the wedge 206. This allows the motor 210 to actually drive the sliding wedge 206 and hence the jaws into contact with the gripped objects at very high speeds. The spring 301 provides a mechanical damping to the collision between gripper jaws and objects to allow the motor 210 to be controlled more loosely by the servo electronics so that the motor 210 and screw 211 are not damaged by impact.

The spring 301 can be further utilized to control grip pinch forces if the screw 211 and nut 302 are used to collapse the spring 301 in increasing amounts to get more force to the jaws. The spring compression is directly related to gripper pinch force and can be measured or sensed by an electrical position sensor 303 that can turn off the gripper motor 210 at a given force value.

A flywheel 304 may be added to the leadscrew 211 in order to increase angular momentum and inertia as the motor 210 is ramped up to speed.

Figure 4:
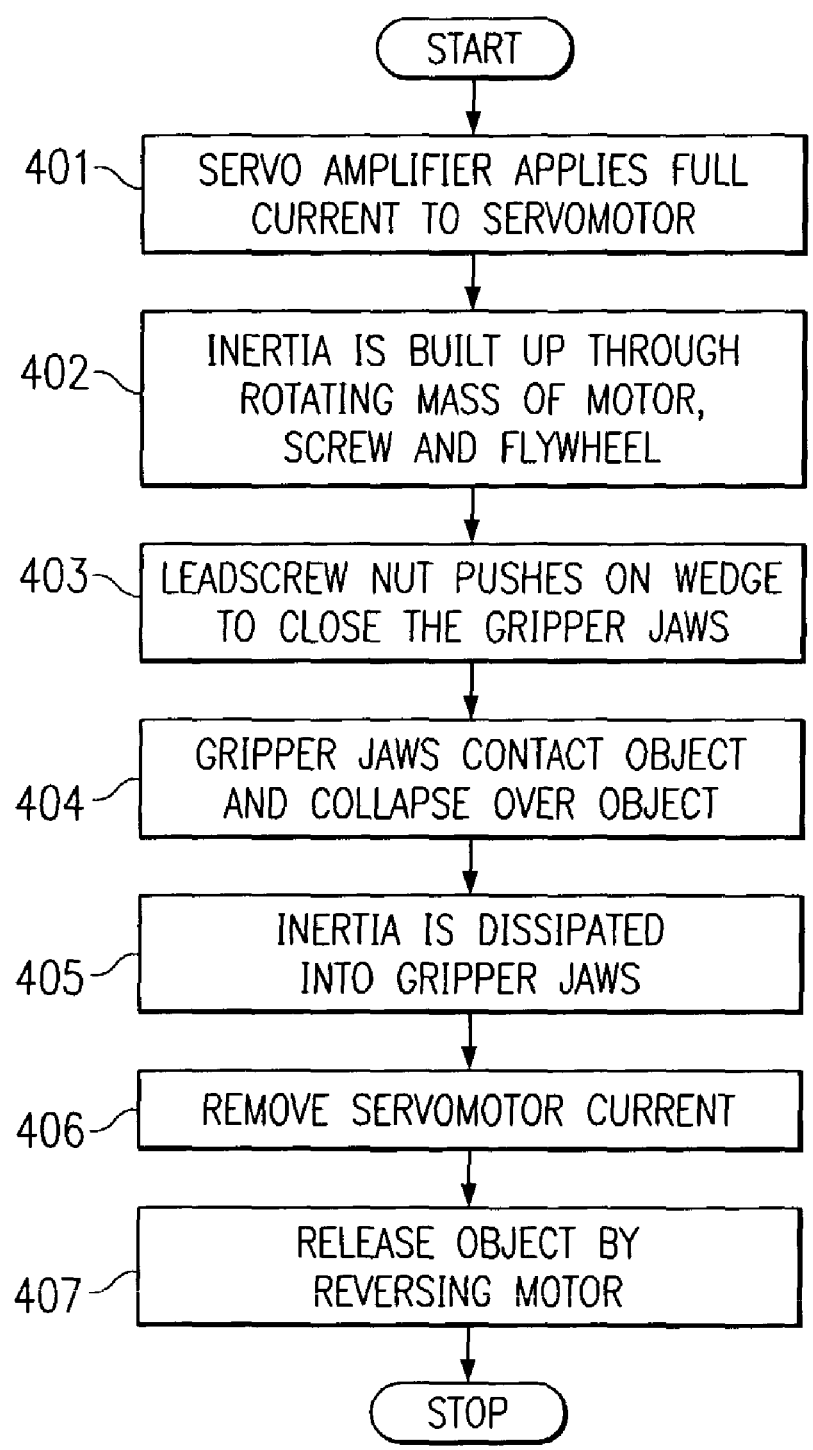
FIG. 4 depicts a flowchart illustrating the operation of the inertia driven gripper in accordance with the present invention.

Referring to FIG. 4, a flowchart illustrating the operation of the inertia driven gripper is depicted in accordance with the present invention. To grip a media cartridge, the motor is given full current by the servo amplifier to spin up the motor core and leadscrew (step 401). As the motor increases its speed, inertia is built up through the rotating mass of the motor, leadscrew, and flywheel (step 402).

The leadscrew nut pushes on the wedge, which begins to close the gripper jaws (step 403). At this point, there is no gripping load on the motor because the gripper jaws have not yet contacted the media cartridge. The assembly is free to spin up and build inertia until an object is encountered.

Driving the servo actuator as hard as possible and building up the inertia of the rotating components takes advantage of the free motion just before impact with the object, releasing the stored energy at impact. This provides a higher grip force than if the motor were driven slowly into a gripped state after the jaws contact an object. The force is built up when time is not important and released when time is critical. It is this advantage in time saving that makes inertia driven mechanisms superior to other systems. For example, a gripper assembly may be allowed only 20 milliseconds to actually grip an object. With an inertia driven system, the energy build may begin earlier to get the mechanism ramped up before the start of the 20 millisecond window.

When the gripper jaws contact an object, the jaws collapse shut over the object (step 404), and the inertia of the rotating components is dissipated into the gripper jaws as they collapse (step 405). The inertia of the system is at a maximum, and the motor is still energized to add to the effective force of the mechanism. By using this inertial approach, a smaller motor running at high speeds will produce a faster, more powerful gripping action than a larger motor using conventional methods. In high-speed applications such as gripping data cassettes, it is desirable to produce a high force output with as small an actuator as possible. Small actuators save weight, are less costly and require less power to operate.

After the object is gripped, the motor current is removed (step 406) and the jaws remain locked due to the leadscrew mechanical friction and the amplification of the wedge effect. Releasing the grip is easier for the small motor, by simply reversing the motor (step 407).

The features of the present invention allow the gripper to achieve higher grip forces at unsurpassed speeds, as well as maintain a gasp on objects when power is lost.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for gripping objects by means of a robotic gripper mechanism, wherein the gripper mechanism comprises gripping jaws, a wedge actuator between the gripping jaws, wherein the wedge actuator moves the gripping jaws together and apart as it slides backward and forward, and a motor that moves the wedge actuator by means of a connecting leadscrew, the method comprising the steps of:

applying current to the motor, wherein the motor begins rotating before the gripper mechanism makes contact with an object; and in response to contacting an object, gripping the object with the gripper jaws, wherein inertia from the rotating mass of the motor and leadscrew increases the force and speed of the gripping action, wherein the robotic gripper mechanism further comprises a nut connecting the leadscrew and wedge, and wherein the nut applies pressure to the wedge.

2. The method according to claim 1, wherein the robotic gripper mechanism further comprises a spring between the nut and wedge, wherein the spring provides an incremental force to contact between the gripper jaws and gripped objects.

3. The method according to claim 1, wherein the robotic gripper mechanism further comprises a flywheel that rotates with the leadscrew, wherein the flywheel provides additional rotating mass and inertia to the mechanism.

* * * * *